(12) United States Patent
    Kaufman

(10) Patent No.: US 8,989,371 B2
(45) Date of Patent: Mar. 24, 2015

(54) COMMUNITY TELEPHONY BROKERAGE SYSTEM AND TECHNIQUES

(75) Inventor: Amit Kaufman, Tel-Aviv (IL)

(73) Assignee: Microsoft Corporation, Redmond, WA (US)

( * ) Notice: Subject to any disclaimer, the term of this patent is extended or adjusted under 35 U.S.C. 154(b) by 1490 days.

(21) Appl. No.: 12/550,279

(22) Filed: Aug. 28, 2009

(65) Prior Publication Data

US 2011/0051915 A1    Mar. 3, 2011

(51) Int. Cl.
   *H04M 7/00*       (2006.01)
   *H04M 3/42*       (2006.01)
   *H04M 15/00*      (2006.01)

(52) U.S. Cl.
   CPC .......... *H04M 3/42008* (2013.01); *H04M 15/00* (2013.01); *H04M 15/70* (2013.01); *H04M 15/765* (2013.01); *H04M 15/7652* (2013.01)
   USPC .... 379/373.03; 370/356; 455/418; 455/435.1

(58) Field of Classification Search
   USPC .............................................. 379/111–112.1
   See application file for complete search history.

(56) References Cited

U.S. PATENT DOCUMENTS

| | | | |
|---|---|---|---|
| 6,181,789 B1 * | 1/2001 | Siegmund et al. ............. | 379/230 |
| 7,239,690 B2 * | 7/2007 | Pearson et al. ........... | 379/207.16 |
| 7,386,111 B2 | 6/2008 | Holder | |
| 7,388,854 B2 | 6/2008 | Lee et al. | |
| 2002/0077102 A1 * | 6/2002 | Achuthan et al. ............. | 455/435 |
| 2003/0043974 A1 * | 3/2003 | Emerson, III .............. | 379/88.13 |
| 2004/0110465 A1 * | 6/2004 | Bedingfield et al. ......... | 455/3.05 |
| 2005/0015443 A1 * | 1/2005 | Levine et al. ................ | 709/204 |
| 2005/0232253 A1 * | 10/2005 | Ying et al. .................... | 370/356 |
| 2005/0277407 A1 | 12/2005 | Ahn et al. | |
| 2007/0091878 A1 | 4/2007 | Croak et al. | |
| 2007/0149182 A1 * | 6/2007 | Muratore et al. ............. | 455/417 |
| 2007/0254637 A1 * | 11/2007 | Plant et al. .................... | 455/418 |
| 2008/0081617 A1 | 4/2008 | Yoo et al. | |
| 2008/0152120 A1 | 6/2008 | Bugenhagen | |

(Continued)

OTHER PUBLICATIONS

Unuth, Nadeem, "Anonymous/Virtual Phone Numbers", retrieved at <<http://voip.about.com/od/security/tp/AnonymousNumberServices.htm>>, Jul. 9, 2009, 2 Pages.
"Vphonet", retrieved at <<http://www.vphonet.com/numberlist>>, Jul. 9, 2009, 3 Pages.
"Mobilink Software", retrieved at <<http://www.mobilelogic.org/VirtualMobile.asp>>, Jul. 9, 2009, 2 Pages.

(Continued)

*Primary Examiner* — Duc Nguyen
*Assistant Examiner* — Assad Mohammed
(74) *Attorney, Agent, or Firm* — Brian Haslam; Aaron Hoff; Micky Minhas

(57) ABSTRACT

A community telephony brokerage system ("CTBS") and techniques for facilitating telephony communications (including but not limited to text messages, audible messages, multimedia messages, commands, and voice communications) between members of a virtual or real-life community are described. The CTBS operates in conjunction with any known or later developed communication application or service, such as an email application, a social networking application, a gaming application, a discussion forum application, a blogging application, or a subscription/publication application, to provide intra-community telephonic communications via community members' own electronic devices, in a manner that keeps community members' unique telephone numbers secret from other members, and preserves other desired levels of privacy and/or security established by the community and/or communication application.

20 Claims, 3 Drawing Sheets

(56) References Cited

U.S. PATENT DOCUMENTS

2009/0124238 A1 5/2009 Wilson
2010/0020952 A1* 1/2010 Leung et al. ............. 379/142.02

OTHER PUBLICATIONS

"VoIP Now", retrieved at <<http://www.voipnow.org/features/virtual-phone-numbers>>, Jul. 9, 2009, 8 Pages.

* cited by examiner

COMMUNITY TELEPHONY BROKERAGE SYSTEM AND TECHNIQUES

BACKGROUND

Members of real-life or virtual communities often communicate via server- or service-based communication applications, including but not limited to email applications, social networking applications, gaming applications, discussion forum applications, blogging applications, subscription/publication applications, and the like. To bring desired levels of anonymity and/or security to their communications, community members may identify themselves using representations (such as avatars and/or user names) or other items of information.

Members of a community may also wish to engage in telephonic communications with other community members. Typical server- or service-based communication applications, however, are not configured—from either business or technical perspectives—to support telephonic communications in a failsafe and cost-effective manner. Although community members can exchange their own unique telephone numbers (generally issued by operators of telephony networks including but not limited to wireless networks, public switched telephony networks, or voice-over-IP networks), use and sharing of unique telephone numbers between community members may not preserve the desired levels of privacy or security afforded by communication applications.

SUMMARY

A community telephony brokerage system ("CTBS") and techniques for facilitating telephony communications (including but not limited to text messages, multimedia messages, audible messages, commands, and voice communications) between members of a virtual or real-life community are discussed herein. The CTBS operates in conjunction with any known or later developed communication application or service, such as an email application, a social networking application, a gaming application, a discussion forum application, a blogging application, or a subscription/publication application, to provide intra-community telephonic communications via community members' own electronic devices, in a manner that keeps community members' unique telephone numbers secret from other members, and preserves other desired levels of privacy and/or security established by the community and/or communication application.

In an exemplary implementation, the CTBS includes: one or more telephony interfaces responsive to receive and transmit telephonic communications from/to one or more known or later developed telephony networks, such as wireless networks, public switched telephony networks, or voice-over-IP networks; one or more application programming interfaces responsive to communicate programmatically with one or more communication applications; and a community number allocator, which is responsible for the non-exclusive assignment of community telephone numbers to community members. The assigned community telephone numbers are selected from among a quantity of community telephone numbers designated by one or more telephony networks for use by the CTBS in providing intra-community telephonic communications.

When a particular community member desires to transmit a telephonic communication to another community member, he or she directs (either via a telephony network or via a communication application) transmission of the communication to a community telephone number assigned specifically to him or her for use in contacting the other community member. For discussion purposes, other community members that may be contacted by a particular community member using the system and techniques discussed herein are referred to as "contacts" of the particular community member. Various examples of possible uses for the CTBS and intra-community telephonic communications, in the context of different types of communities/communication applications, are discussed herein.

Using the CTBS and the techniques discussed herein, the same community telephone numbers may be assigned to the contacts of different community members—each different community telephone number is able to represent a single contact for each community member—and the number of community members is unlimited by the quantity of community telephone numbers. In this manner, there is no need to allocate impractically large quantities of telephone numbers on a per-connection basis. Community members are able to communicate telephonically, with levels of privacy and/or security established by the community being preserved. Communities, communication applications, CTBS providers, and/or telephony network operators may generate new business models and/or revenue.

This Summary is provided to introduce a selection of concepts in a simplified form. The concepts are further described in the Detailed Description section. Elements or steps other than those described in this Summary are possible, and no element or step is necessarily required. This Summary is not intended to identify key features or essential features of the claimed subject matter, nor is it intended for use as an aid in determining the scope of the claimed subject matter. The claimed subject matter is not limited to implementations that solve any or all disadvantages noted in any part of this document.

DETAILED DESCRIPTION

The community telephony brokerage system ("CTBS") and techniques described herein operate in conjunction with any known or later developed network-based communication applications to provide private, anonymous telephonic communications (including but not limited to text messages, multimedia messages, audible messages, commands, and voice calls) between members of a virtual or real-life community. Exemplary operation of the CTBS is described with reference to online dating and gaming communities/applications, although it will be appreciated that there are virtually unlimited combinations of communities and communication applications with which the system and techniques described herein may be implemented or used.

Figure 1:
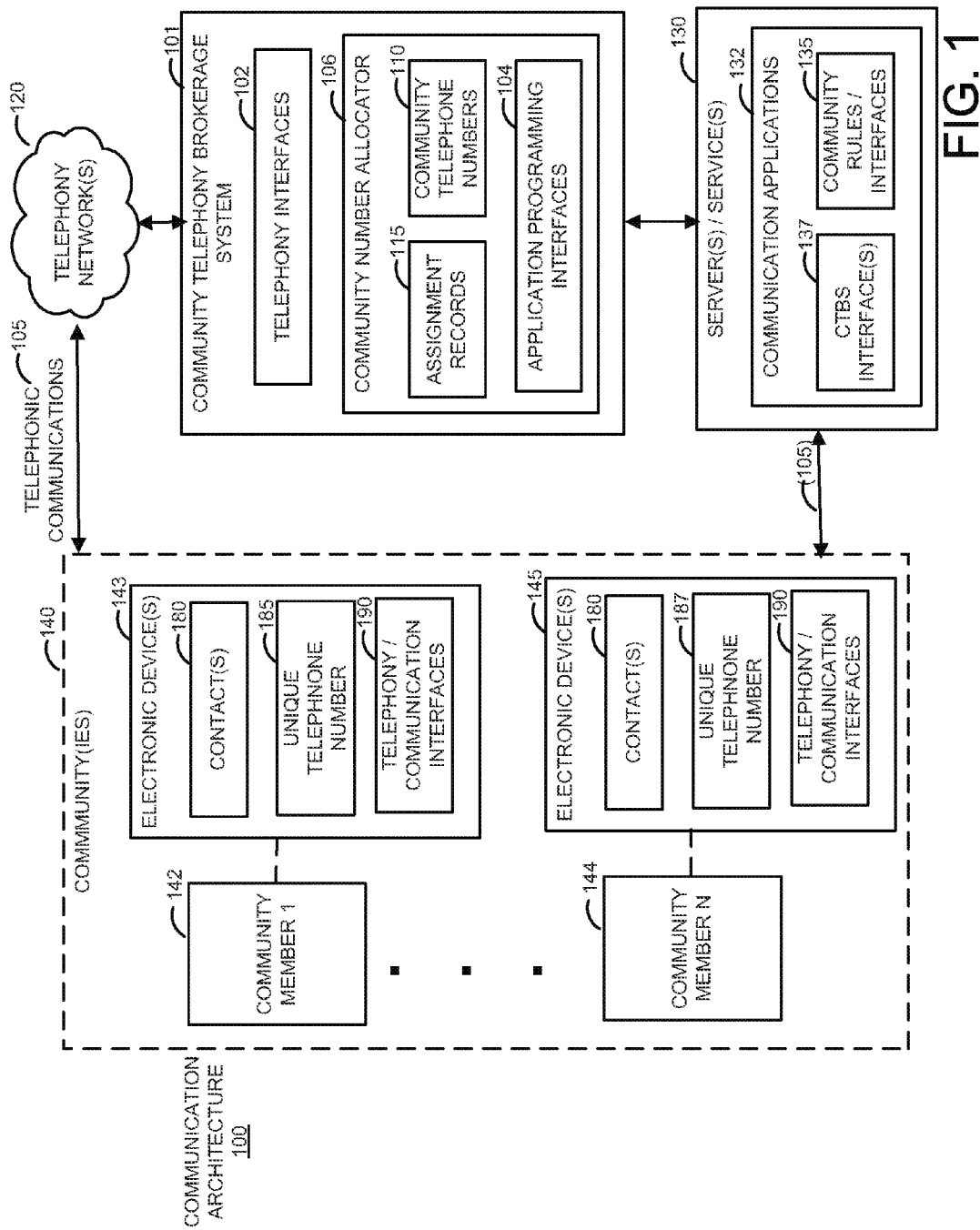
FIG. 1 is a simplified functional block diagram illustrating an exemplary communication architecture within which aspects of a community telephony brokerage system ("CTBS") may be implemented or used.

Turning now to the drawings, where like numerals designate like components, FIG. 1 is a simplified functional block diagram illustrating an exemplary communication architecture 100 within which aspects of CTBS 101 are implemented or used. CTBS 101 facilitates telephonic communications 105, including but not limited to text messages, multimedia messages, audible messages, voice calls, and commands, between community members (two community members, community member1 142 and community member N 144, of members 1 through N, are shown) of a virtual or real-life community 140. A virtual or real-life community is any group of people or entities having any pre-established affiliation or logical relationship, who interact via a particular communication application 132 (discussed further below) for any legal purpose. For example; some purposes include but are not limited to business purposes, social purposes, educational purposes, professional purposes, and entertainment purposes. Although one community 140 is shown, it will be appreciated that any number of communities, having any number of members, are possible, and that community members may be individual people or entities/groups of people, such as organizations, businesses, families, and the like.

Community members 142 and 144 are authorized to operate electronic devices configured to send or receive telephonic communications on behalf of the members via unique telephone numbers—as shown, community member 1 142 is authorized to operate electronic device 143 configured for telephonic communication via unique telephone number 185, and community member N 144 is authorized to operate electronic device 145 configured for telephonic communication via unique telephone number 187. Electronic devices may be any known or later developed electronic devices, including but not limited to mobile phones, landline phones, gaming devices, voice-over-IP phones, personal computers, personal digital assistants, media players, facsimile machines, and the like.

Unique telephone numbers are any telephone numbers, in any format, issued by any telephony network (telephony networks 120 are discussed further below) that uniquely identify communications from or to a particular community member within the issuing telephony network. Generally, but not necessarily, unique telephone numbers are designated for use in connection with particular electronic devices.

Contacts 180 and telephony/communication interfaces 190 are associated with electronic devices 143 and 145. For a particular member of a particular community, contacts 180 represent other community members that may be contacted by the particular community member via CTBS 101 and/or the techniques discussed herein. An avatar, a user name, and/or other items of information (including but not limited to an electronic business card, an address book entry, or assigned community telephone number (discussed further below)) may be used to represent a particular contacts. Telephony/communication interfaces 190 represent physical or logical elements (for example, user interfaces) that enable an electronic device to receive information from, or transmit information to, telephony network(s) 120 and communication application(s) 132.

Telephony network(s) 120 represent any existing or future, public or private, wired or wireless, wide-area or local-area, packet-switched or circuit-switched telecommunication infrastructures or technologies. Exemplary telephony networks include: cellular networks, satellite networks, hybrid networks, copper wire networks, voice-over-IP networks, and public switched telephone networks.

Communication applications 132 represent any known or later developed programs or groups of programs that facilitate electronic communications between members of a particular community 140 in accordance with community rules/interfaces 135. As shown, communication applications 132 are implemented within or as servers/services 130, generally in a public or private, packet-switched network-based environment such as the Internet or a private local-area or wide-area managed network (not shown). Examples of communication applications 132 include but are not limited to email applications, social networking applications, gaming applications, discussion forum applications, blogging applications, subscription/publication applications, and the like. Communication applications 132 further include CTBS interfaces 137, used for communications with CTBS 101 (discussed further below), and community rules/interfaces 135.

Community rules/interfaces 135 are established to govern the identification and interactions of community members via communication applications 132. For example, network- or client-side user interfaces may be used for obtaining information from, and providing information to, community members via communication applications 132. Levels of anonymity and security may be established through community rules or user preferences—for example, users may identify themselves using representations (such as avatars and/or user names) or other items of information, may consent (and withdraw consent) for communication with other community members, and may specify how incoming or outgoing communications are to be received or transmitted.

CTBS 101 includes: telephony interfaces 102, which are responsive to receive and transmit telephonic communications from/to telephony network(s) 120; application programming interfaces 104, which communicate programmatically with communication application(s) 132; and community number allocator 106, which is responsible for the non-exclusive assignment of community telephone numbers 110 to community members, and for keeping records 115 of such assignments. Community telephone numbers 110 represent a quantity of telephone numbers designated by one or more telephony networks 120 for use by the CTBS in providing intra-community telephonic communications. In one possible implementation, assignment records 115 are lookup tables.

Aspects of CTBS 101 may be implemented within one or more network-side operating environments, such as within telephony networks 120 and/or environments in which servers/services 130 operate. In general, design choices and/or operating environments dictate how and where specific functions of CTBS 101 are implemented. Such functions may be implemented using hardware, software, firmware, or combinations thereof.

Figure 2:
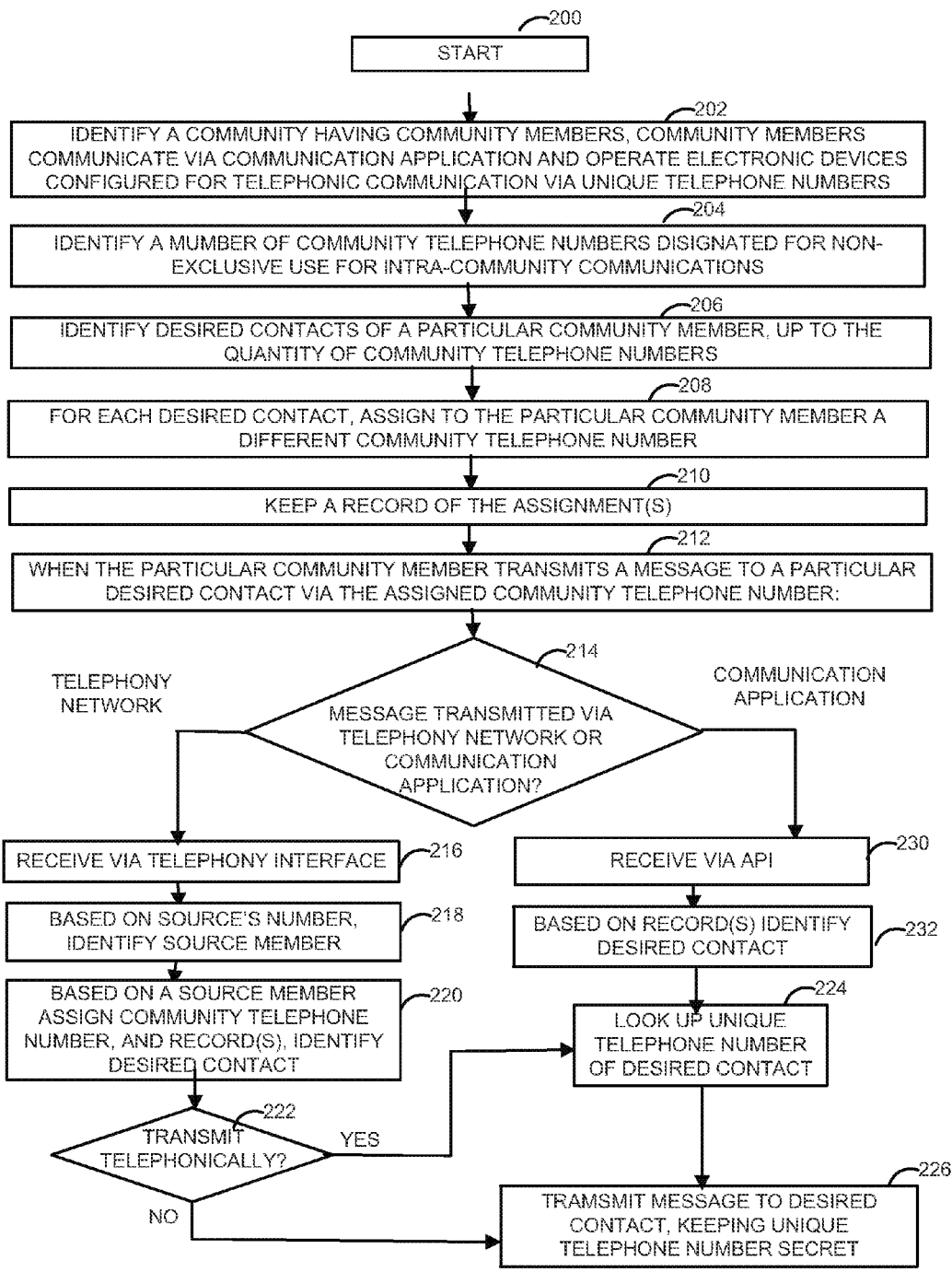
FIG. 2 is a flowchart of an exemplary method for using aspects of the CTBS shown in FIG. 1 to facilitate intra-community telephonic communications.

With continuing reference to FIG. 1, FIG. 2 is a flowchart illustrating an exemplary method for using aspects of CTBS 101 to facilitate intra-community telephonic communications in a manner that preserves levels of privacy and/or security established by the community, and enables the generation of new business models and/or revenue for communities, communication applications, CTBS providers, and/or telephony network operators.

The method illustrated in FIG. 2 may be implemented by computer-executable instructions (such as computer-executable instructions 306, shown and discussed in connection with FIG. 3) that are stored in a computer-readable medium (computer-readable media 304 are also shown and discussed in connection with FIG. 3) and executed by one or more general, multi-purpose, or single-purpose processors (such as processor 302, also shown and discussed in connection with FIG. 3). Unless specifically stated, the methods or steps thereof are not constrained to a particular order or sequence. In addition, some of the methods or steps thereof can occur or be performed concurrently.

The method begins at block 200, and continues at block 202, where a community, such as community 140, is identified. The community has community members, such as community member1 142 and community member N 144, who communicate via a communication application, such as communication application 132, and who also operate electronic devices, such as electronic device 143 and electronic device 145, which are configured for telephonic communication via unique telephone numbers, such as unique telephone number 185 and unique telephone number 187, respectively.

In an exemplary scenario, communication application 132 provides one or more network- or client-based interfaces 135, such as user interfaces, which facilitate electronic communication between community members. Communication application 132 also generally implements community rules, including but not limited to rules relating to privacy and security. Via the interface(s) and/or rules, a particular community member who wishes to transmit or receive intra-community telephonic communications inputs (or authorizes the input of) a unique telephone number designated for uniquely identifying telephonic communications by or to the particular community member (generally, the unique telephone number has been issued by a telephony network or other communication network for use in connection with a particular electronic device, although it is not necessary for the unique number to be associated with a single electronic device). Communication application 132 communicates the unique telephone number to CTBS 101 (for example, via a call to an application programming interface 104), which binds or otherwise associates the identity of the particular community member with the unique telephone number.

An exemplary call to an application programming interface 104 named "Bind( )," which accepts certain parameters and binds or otherwise associates the identity of a particular community member with his or her unique telephone number, is provided below.

"Bind (Community, Community Member, Unique Phone Number)"

Referring again to the flowchart of FIG. 2, at block 204, a number of community telephone numbers designated for non-exclusive use for intra-community communications, such as community telephone numbers 110, are identified.

Next, at block 206, one or more desired contacts (up to the quantity of community telephone numbers identified at block 204) of a particular community member are identified. In an exemplary scenario, the particular community member notifies communication application 132 (via user interface(s) 135, for example) of one or more other community members with whom he or she desires to communicate telephonically (such other community members are referred to for discussion purposes as "contacts.") Contacts may be pre-identified, or identified at the time communication is desired. Consent for such telephonic communication may be obtained from the contact(s), or withdrawn by the contact, either before or at the time of the desired communication. Communication application 132 communicates the desired contact's unique telephone number to CTBS 101 (for example, via a call to an application programming interface 104), which keeps (for example, stores) a record of the contact (in a data structure such as a table, for example).

An exemplary call to an application programming interface 104 named "Add_Connection( )," which accepts certain parameters and records the existence of a particular community member's contact, is provided below.

"Add_Connection (Community, Community Member, Contact)"

An exemplary call to an application programming interface 104 named "Remove_Connection( )," which accepts certain parameters and removes a particular community member's contact, is provided below.

"Remove_Connection (Community, Community Member, Contact)"

As indicated at block 208, for each desired contact, a different community telephone number is assigned to the particular community member. In an exemplary scenario, CTBS 101 (via community number allocator 106, for example) assigns the particular community member a different community telephone number for each contact (up to the designated quantity of community telephone numbers), and stores a record of the assignment(s), as indicated at block 210. In one possible implementation, the assignments are recorded in a lookup table. One possible way to make the assignment(s) known to the particular community member is by transmitting electronic business cards associated with the contacts to the unique telephone number associated with the particular community member's electronic device. The electronic business cards may be distributed by CTBS 101, communication application 132, or a different application or service. Another possible way to make the assignment(s) known to the particular community member is via a proprietary software program installed on the community member's electronic device that can control his contact book (such as a Java application of a SyncML implementation).

An exemplary call to an application programming interface 104 named "Send_Connection_Vcard( )," which accepts certain parameters and requests CTBS 101 to transmit an electronic business card to a particular community member, notifying him or her of an assignment of a community telephone number for a particular contact, is provided below.

"Send_Connection Vcard (Community, Community Member, Contact)"

Next, as indicated at block 212, when the particular community member transmits a message, such as a telephonic communication, to a particular contact, he or she directs the transmission of the telephonic communication to the assigned community telephone number. It is determined at diamond 214 whether the transmission was directed using telephony network(s) 120, or communication application(s) 132.

The method continues at block 216 in the case where the particular community member directs the transmission of the telephonic communication via telephony network(s) 120—for example, the particular community member causes his or her electronic device to dial the assigned community telephone number. Telephony network(s) 120 route the telephonic communication to one or more telephony interfaces 102 of CTBS 101, and CTBS 101 receives the telephonic communication, as indicated at block 216. As indicated at block 218, the unique telephone number associated with the electronic device from which the telephonic communication originated (which was previously input to communication application 132 and communicated to CTBS 101 via one or more application programming interfaces 104) is known, and thus CTBS 101 is able to identify the particular community member. At block 220, CTBS 101 consults the stored record(s) of the particular community member, and based on the assigned community telephone number that was dialed, the particular contact can be identified from the stored record(s).

It is determined at diamond 222 how the telephonic communication is to be transmitted to the particular contact. Community rules and/or the contact's preferences may be consulted to determine the manner in which the telephonic message is delivered to the contact.

If telephonic transmission to an electronic device operated by the particular contact is indicated at diamond 222, then at block 224, the previously supplied information regarding the electronic device of the particular contact, including the unique telephone number associated with the electronic device, may be ascertained, and as indicated at block 226, CTBS 101 may cause the unique telephone number associated with the electronic device to be dialed to transmit the telephonic communication to the particular contact. It is noted that the telephone number from which the contact's unique telephone is dialed may be a unique telephone number associated with CTBS 101 and/or communication application 132, or alternatively may be a community telephone number (the same or different community telephone number as was dialed by the particular community member) specifically assigned to the contact for use in telephonically communicating with the particular community member. The desire for telephonic transmission may be indicated by a particular community member, and communicated by communication application 132 to CTBS 101 via one or more application programming interface(s) 104. An exemplary call to an application programming interface 104 named "Initiate_Call( )," which accepts certain parameters and requests CTBS 101 to transmit a telephonic communication to a particular community member, is as follows: "Initiate_Call (community, community member, contact)." Exemplary callbacks to communication service 132, initiated by a member's electronic device, which request telephonic transmission to an electronic device operated by a particular contact, and acknowledge receipt of a telephonic communication by a contact, respectively, are as follows: "Call_Initiate_Request (community, particular community member, contact)"; and "Message_Received (community, particular community member, contact, telephonic communication)".

If telephonic transmission to an electronic device operated by the particular contact is not indicated at diamond 222 (here it is noted that in practice, both telephonic and non-telephonic transmission may be indicated), then the method proceeds to block 226. If the community rules and/or the contact's preferences indicate that the telephonic communication is to be delivered via the communication application, CTBS 101 may cause communication application 102 (via a callback from one or more application programming interfaces 104, for example) to deliver the telephonic communication to the particular contact. For example, a user interface may be used to transmit the telephonic communication to the contact.

In the case where, at diamond 214, the particular community member directs the transmission of the telephonic communication via communication application 132, the method continues at block 230, where the particular community member inputs information (such as the assigned community telephone number for the particular contact, or the particular contact's avatar, user name, or other identifying information) via interface(s) 135 that causes communication application 132 to call application programming interface(s) 104, requesting that the telephonic communication be transmitted to the particular contact. An exemplary call to an application programming interface 104 named "Send_Message ( )," which accepts certain parameters and requests CTBS 101 to transmit a telephonic communication to a particular community member, is as follows: "Send_Message(community, community member, contact, telephonic communication)."

As indicated at blocks 232 and 224, CTBS 101 consults the stored record(s) of the particular community member. Based on the identity of the particular community member and the identity of the particular contact and/or community telephone number, the unique telephone number associated with an electronic device operated by the contact can be identified, and CTBS 101 causes the unique telephone number to be dialed, via telephony interface(s) 120, to transmit the telephonic communication to the particular contact. It is noted that the telephone number from which the contact's unique telephone is dialed may be a unique telephone number associated with the CTBS and/or the communication application, or alternatively may be a community telephone number assigned to the contact for use in telephonically communicating with the particular community member.

If the community rules and/or the contact's preferences indicate that the telephonic communication is (alternatively or in addition) to be delivered via the communication application, CTBS 101 may cause the communication application (via a callback from one or more application programming interfaces, for example) to deliver the telephonic communication to the particular contact. For example, a user interface may be used to transmit the telephonic communication to the particular contact.

In this manner, the same community telephone numbers may be assigned to the contacts of different community members—each different community telephone number is able to represent a single contact for each community member—yet the number of community members is unlimited by the quantity of community telephone numbers. Using an assignment record such as a lookup table, there is no need to allocate impractically large quantities of telephone numbers on a per-connection basis. Community members are able to communicate telephonically, with levels of privacy and/or security established by the community being preserved. Communities, communication applications, CTBS providers, and/or telephony network operators may generate new business models and/or revenue.

CTBS 101 and the methods illustrated in FIG. 2 may be used to facilitate intra-community telephonic communication for different types of communities/communication applications. Two examples are described below—online dating and gaming communities/applications—although it will be appreciated that there are virtually unlimited combinations of communities and communication applications with which the system and techniques described herein may be implemented or used.

Dating Community Example

In an online dating community, community members access an online dating service via a web browser interface, and provide a unique phone number associated with an electronic device (referred to as a cellular phone for discussion purposes) configured for telephonic communication. In one scenario, member A accesses the online dating service, and requests to contact member B telephonically. If member B consents, the dating service requests CTBS 101 to assign a particular community telephone number to member A for use in contacting member B, and to assign a particular (the same or different) community telephone number to member B for use in contacting member A. CTBS 101 keeps records of the assignments.

When member A posts to the online dating service a communication to be delivered telephonically to member B (assume for discussion purposes the posted communication is a text message), then the online dating service requests (via a call to application programming interface(s) 104) CTBS 101 to transmit the text message to member B's cellular phone. Member B receives the text message on his or her cellular phone, which is indicated as having been sent from the community telephone number assigned to member B for use in contacting member A. Member B can therefore reply to the text message, and (1) the content of the reply may be handed back to the online dating service (which may continue the conversation thread online, and/or request that CTBS 101 transmit the reply back to member A's cellular phone), and/or (2) member B may use his or her cellular phone to transmit the content of the reply to the community telephone number assigned to member B for use in contacting member A via telephony network(s) 120 (the content of the reply will be received via telephony interfaces 102 of CTBS 101, and passed to member A's cellular phone by CTBS 102).

If either member A or member B wishes to withdraw from contact with the other, they may do so via the online dating service, which requests (via a call to application programming interface(s) 104) CTBS 101 to remove the records of the assignments of the community telephone numbers.

Gaming Community Example

In an online gaming community, which for discussion purposes is referred to as a chess community, players may be defined as community members and be allowed to play chess online and offline. When a community member invites another community member to play chess and the other community member is not online (but is assumed to have access to a cellular phone having a unique telephone number registered with the chess community and CTBS 101), the online chess service/application may request that CTBS 101 send an invitation to the offline community member in the form of a text message to the offline member's cellular phone. The invitation text message may be sent from a community telephone number that is not assigned to any particular community member for use in contacting any other community member, but instead represents the online chess service/application.

When the offline community member accepts the invitation (for example, replaying to the text message with another text message), the chess board may be sent to the offline member—from a community telephone number assigned to the offline member for contacting the online member—in the form of a multimedia message at every step of the game. The online chess service/application may show the chess board to the online member on his or her computer. It is possible for the offline member to play multiple online opponents concurrently, identified by the different community telephone numbers assigned to the offline member for contacting different online opponents.

Figure 3:
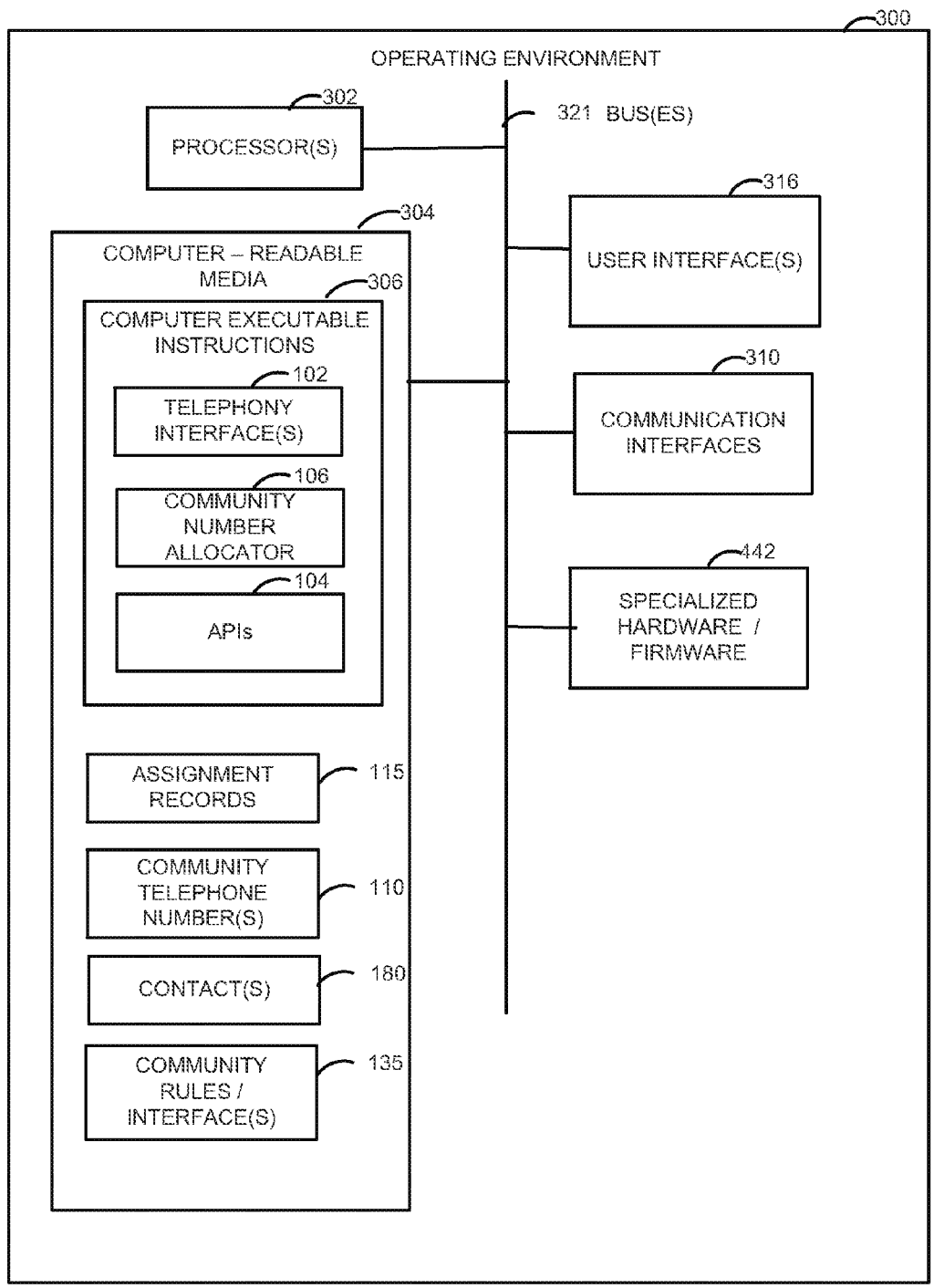
FIG. 3 is a simplified functional block diagram of an exemplary operating environment in which aspects of the CTBS shown in FIG. 1 and/or the method shown in FIG. 2 may be implemented or used.

With continuing reference to FIGS. 1 and 2, FIG. 3 is a simplified functional block diagram of an exemplary operating environment 300, with which aspects of CTBS 101 may be implemented or used. Operating environment 300 is indicative of a wide variety of general-purpose, special-purpose, client- or server-based, stand-alone or networked computing environments. Operating environment 300 may be, for example, a type of computer, such as a personal computer, a workstation, a server, a consumer electronic device, or any other type of stand-alone or networked computing device or component thereof now known or later developed. Operating environment 300 may also be a distributed computing network or Internet-based service, for example.

One or more components shown in FIG. 3 may be packaged together or separately to implement functions of operating environment 300 (in whole or in part) in a variety of ways. As shown, bus(es) 321 carries data, addresses, control signals and other information within, to, or from computing environment 300 or components thereof.

Communication interface(s) 310 are one or more physical or logical elements that enhance the ability of operating environment 300 to receive information from, or transmit information to, another operating environment (not shown) via a communication medium. Examples of communication media include but are not limited to: wireless or wired signals; computer-readable storage media; computer-executable instructions; communication hardware or firmware; and communication protocols or techniques.

Specialized hardware/firmware 442 represents any hardware or firmware that implements functions of operating environment 300. Examples of specialized hardware/firmware 442 include encoder/decoders ("CODECs"), decrypters, application-specific integrated circuits, secure clocks, and the like.

A processor 302, which may be one or more real or virtual processors, controls functions of operating environment 300 by executing computer-executable instructions 306 (discussed further below).

Computer-readable media 304 represent any number and combination of local or remote components, in any form, now known or later developed, capable of recording, storing, or transmitting computer-readable data, such as instructions 306 (discussed further below) executable by processor 302. In particular, computer-readable media 304 may be, or may include persistent memory or main memory, and may be in the form of: a semiconductor memory (such as a read only memory ("ROM"), any type of programmable ROM ("PROM"), a random access memory ("RAM"), or a flash memory, for example); a magnetic storage device (such as a floppy disk drive, a hard disk drive, a magnetic drum, a magnetic tape, or a magneto-optical disk); an optical storage device (such as any type of compact disk or digital versatile disk); a bubble memory; a cache memory; a core memory; a holographic memory; a memory stick; or any combination thereof. Computer-readable media 304 may also include transmission media and data associated therewith. Examples of transmission media/data include, but are not limited to, data embodied in any form of wireline or wireless transmission, such as packetized or non-packetized data carried by a modulated carrier signal.

Computer-executable instructions 306 represent any signal processing methods or stored instructions that electronically control predetermined operations on data. In general, computer-executable instructions 306 are implemented as software programs according to well-known practices for component-based software development, and encoded in computer-readable media (such as one or more types of computer-readable storage media 304). Software programs may be combined or distributed in various ways.

User interface(s) 316 represent a combination of presentation tools and controls that define the way a user, such as a community member, interacts with operating environment 300. One type of user interface 316 is a graphical user interface ("GUI"), although any known or later developed type of user interface is possible. Presentation tools are used to receive input from, or provide output to, a user. An example of a physical presentation tool is a display such as a monitor device. An example of a logical presentation tool is a data organization technique (for example, a window, a menu, or a layout thereof). Controls facilitate the receipt of input from a user. An example of a physical control is an input device such as a remote control, a display, a mouse, a pen, a stylus, a trackball, a keyboard, a microphone, or a scanning device. An example of a logical control is a data organization technique (for example, a window, a menu, or a layout thereof) via which a user may issue commands. It will be appreciated that the same physical device or logical construct may function as an interface for both inputs to, and outputs from, a user.

Various aspects of an operating environment and an architecture/techniques that are used to implement aspects of CTBS 101 have been described. It will be understood, however, that all of the described elements need not be used, nor must the elements, when used, be present concurrently. Elements described as being computer programs are not limited to implementation by any specific embodiments of computer programs, and rather are processes that convey or transform data, and may generally be implemented by, or executed in, hardware, software, firmware, or any combination thereof.

Although the subject matter herein has been described in language specific to structural features and/or methodological acts, it is also to be understood that the subject matter defined in the claims is not necessarily limited to the specific features or acts described above. Rather, the specific features and acts described above are disclosed as example forms of implementing the claims.

It will further be understood that when one element is indicated as being responsive to another element, the elements may be directly or indirectly coupled. Connections depicted herein may be logical or physical in practice to achieve a coupling or communicative interface between elements. Connections may be implemented, among other ways, as inter-process communications among software processes, or inter-machine communications among networked computers.

The word "exemplary" is used herein to mean serving as an example, instance, or illustration. Any implementation or aspect thereof described herein as "exemplary" is not necessarily to be constructed as preferred or advantageous over other implementations or aspects thereof.

As it is understood that embodiments other than the specific embodiments described above may be devised without departing from the spirit and scope of the appended claims, it is intended that the scope of the subject matter herein will be governed by the following claims.

What is claimed is:

1. A system for facilitating intra-community communications, the system comprising:
    a memory; and
    a processor coupled to the memory and configured to execute one or more computer programs stored in the memory, the one or more computer programs comprising
        one or more telephony interfaces responsive to receive and transmit telephonic communications via a telephony network, and
        one or more application program interfaces responsive to receive programmatic calls from, and generate programmatic callbacks to, a communication application,
    the one or more computer programs, when loaded into the processor, operable to perform a method comprising
    identifying a community having a plurality of community members, the community members able to communicate via a user interface associated with the communication application, and at least some of the community members authorized to operate electronic devices configured for telephonic communication via unique telephone numbers designated for uniquely identifying telephonic communications by or to particular community members,
    identifying a plurality of community telephone numbers, each of the plurality of community telephone numbers designated by the telephony network for non-exclusive use for intra-community communications,
    identifying a quantity of the plurality of community telephone numbers,
    via the user interface, receiving identification of one or more desired contacts for a particular community member, the one or more desired contacts comprising community members selected from among the plurality of community members,
    for each desired contact, up to the quantity, who is authorized to operate an electronic device configured for telephonic communication via a unique contact telephone number, assigning to the particular community member a different community telephone number of the plurality of community telephone numbers, each different community telephone number of the plurality of community telephone numbers able to represent a single contact for each of the plurality of community members, a number of community members of the community unlimited by the quantity of the plurality of community telephone numbers,
    keeping a record of the assignments,
    when a particular assigned community telephone number for a particular contact of a particular community member is used by the particular community member to transmit a message to the particular contact,
    when the message comprises a telephonic communication received from an electronic device configured for telephonic communication via a unique telephone number,
        receiving the message via the one or more telephony interfaces,
        based on the unique telephone number, identifying the particular community member authorized to operate the electronic device,
        based on the particular community member, the particular assigned community telephone number, and the record of the assignments, identifying the particular contact,
        based on the particular contact, identifying the electronic device operated by the particular contact and the unique contact telephone number of the identified electronic device,
        via the one or more telephony interfaces, transmitting the telephonic communication to the electronic device via the unique contact telephone number,
    when the message is received via the communication application,
        receiving the message via a programmatic call from the communication application to the one or more application program interfaces,
        based on the record of the assignments, identifying the particular contact,
        identifying the electronic device operated by the particular contact and the unique contact telephone number of the identified electronic device electronic device, and
        via the one or more telephony interfaces, transmitting the message to the electronic device via the unique contact telephone number, the message transmitted from a community telephone number assigned to the particular contact to represent the particular community member.

2. The system according to claim 1, wherein assigning to the particular community member a different community telephone number of the plurality of community telephone number for each desired contact comprises
    via the one or more telephony interfaces, using an electronic business card to transmit a different community telephone number to the unique contact telephone number of each contact electronic device.

3. A computer-readable memory having computer-executable instructions stored thereon for executing operations that facilitate intra-community communications, the operations comprising:
- pre-assigning a plurality of mappings of a first virtual telephone number to respective receiving devices of a plurality of receiving devices, wherein
  - each of the plurality of mappings is associated to respective and specific initiating devices of a plurality of initiating devices;
- receiving a request from a particular initiating device of the plurality of initiating devices to communicate with a particular receiving device of the plurality of receiving devices, wherein the request identifies the particular receiving device by the first virtual telephone number;
- determining, based at least in part on an identity of the particular initiating device,
  - a particular mapping of the plurality of mappings that is associated with the particular receiving device;
- determining, based at least in part on the determined particular mapping, another
  - telephone number of the particular receiving device; and
- providing an indication of the request to the particular receiving device via the other telephone number.

4. The computer-readable memory of claim 3, wherein the operations further comprise:
- receiving another request from another initiating device of the plurality of initiating devices to communicate with another receiving device of the plurality of receiving devices, the other request identifying the other receiving device by the first virtual telephone number;
- determining, based at least in part on the identity of the other initiating device, another mapping of the plurality of mappings that is associated with the other receiving device;
- determining, based at least in part on the determined other mapping, a carrier assigned telephone number of the other receiving device; and
- providing another indication of the other request to the other receiving device via the carrier assigned telephone number.

5. The computer-readable memory of claim 3, wherein the request includes at least one of a text message to the particular receiving device, a multi-media message to the particular receiving device, and a request for voice communications with the particular receiving device.

6. The computer-readable memory of claim 3, wherein the plurality of receiving devices and the plurality of initiating devices are associated with an online social networking community or with an online gaming community.

7. The computer-readable memory of claim 3, wherein the other telephone number of the particular receiving device is a public switched telephone network (PSTN) telephone number.

8. The computer-readable memory of claim 3, wherein the operations further comprise:
- receiving a request from the particular receiving device of the plurality of receiving devices requesting no future communications from the particular initiating device; and
- removing the particular mapping of the plurality of mappings that is associated with the particular receiving device.

9. The computer-readable memory of claim 3, wherein the operations further comprise:
- providing an electronic data record of the first virtual telephone number to the particular initiating device.

10. The computer-readable memory of claim 3, wherein the operations further comprise:
- mapping a second virtual telephone number to the particular initiating device, wherein the mapping of the second virtual telephone number to the particular initiating device is specific to the particular receiving device; and
- indicating to the particular receiving device that the request originated from the second virtual telephone number.

11. A method for facilitating intra--community communications, comprising:
- pre-assigning, by a computing device of an online community, a plurality of mappings of a first intra-community telephone number to respective receiving devices of a plurality of receiving devices, wherein each of the plurality of mappings is associated to respective and specific initiating devices of a plurality of initiating devices;
- receiving, by the computing device, a request from a particular initiating device of the plurality of initiating devices to communicate with a particular receiving device of the plurality of receiving devices, wherein the request identifies the particular receiving device by the first intra-community telephone number;
- determining, based at least in part on an identity of the particular initiating device and the first intra-community telephone number, a particular mapping of the plurality of mappings that is associated with the first intra-community telephone number and the particular receiving device;
- determining, based at least in part on the determined particular mapping, a non-community telephone number of the particular receiving device; and
- providing, by the computing device, an indication of the request to the particular receiving device via the non-community telephone number of the particular receiving device.

12. The method claim 11, further comprising:
- enabling bidirectional communications between the particular initiating device and the particular receiving device.

13. The method claim 11, wherein the request includes at least one of a text message to the particular receiving device, a multi-media message to the particular receiving device, and a request for voice communications with the particular receiving device.

14. The method claim 11, wherein the plurality of receiving devices and the plurality of initiating devices are associated with an online dating community.

15. The method claim 11, wherein the non-community telephone number of the particular receiving device is a telephone number assigned by a telephony service provider and is contactable via the public switched telephone network (PSTN).

16. The method claim 11, further comprising:
- receiving a request from the particular receiving device to revoke an ability of the particular initiating device to contact the particular receiving device; and
- removing the particular mapping of the plurality of mappings associated with the particular receiving device.

17. The method claim 11, further comprising:
- providing an electronic data record of the first intra-community telephone number to the particular initiating device in an electronic contact card.

18. The method claim 11, further comprising:
- mapping a second intra-community telephone number to the particular initiating device, wherein the mapping of the second intra-community telephone number to the particular initiating device is specific to the particular receiving device; and indicating to the particular receiving device that the request originated from the second intra-community telephone number.

19. The method claim 11, wherein the first intra-community telephone number of each of the plurality of mappings is the same intra-community telephone number.

20. The method claim 11, wherein providing, the indication of the request to the particular receiving device via the other telephone number includes providing the indication according to user preferences established for the particular receiving device.

* * * * *